| United States Patent [19] | [11] Patent Number: 4,853,069 |
| Williams et al. | [45] Date of Patent: Aug. 1, 1989 |

[54] ELASTOMERIC STRUCTURES HAVING CONTROLLED SURFACE RELEASE CHARACTERISTICS

[75] Inventors: Cleo M. Williams; Myron D. Sanders, both of Noblesville; William C. Cook, Arcadia, all of Ind.

[73] Assignee: The Firestone Tire & Rubber Company, Akron, Ohio

[21] Appl. No.: 661,644

[22] Filed: Oct. 17, 1984

[51] Int. Cl.$^4$ .................... B29D 30/26; B29D 30/32; B32B 1/10
[52] U.S. Cl. .................... 156/401; 152/511; 152/512; 156/132; 156/133; 156/289; 156/416; 249/65; 264/213; 264/338; 425/52; 427/256; 427/393.5; 428/12; 428/35.7; 428/36.1; 428/36.8; 524/273; 524/274; 524/499; 524/511; 524/576; 524/586
[58] Field of Search .................... 156/110.1, 401, 118, 156/132, 133, 416, 289; 524/511, 273, 274, 499, 576, 586; 428/35, 36, 517, 494, 35.7, 36.1, 36.8; 152/349, 350, 374, 330 R, 511, 512, 518, 519, 521; 264/213, 338, 130, 326; 249/65; 425/52, 33, 45, 48; 441/131; 114/345; 427/256, 393.5

[56] References Cited

U.S. PATENT DOCUMENTS 3,623,900  11/1971  Jonnes et al. ............... 152/353 R X
4,461,795   7/1984  Ogawa ........................... 156/116 X

OTHER PUBLICATIONS

Renfrew et al., Polyethylene, The Technology and Uses of Ethylene Polymers, 2nd Edition, Interscience Publishers, Inc., New York, N.Y. 1960, pp. 397, 400, 402, p. 56,
Materials and Rubber, Rubber World, Bill Communications Inc., New York, N.Y. 1975, pp. 198 and 201, 1975.

*Primary Examiner*—Michael W. Ball
*Assistant Examiner*—Thomas Bokan
*Attorney, Agent, or Firm*—Daniel N. Hall

[57] ABSTRACT

Elastomer structures having exposed controlled surface release characteristics can be made by coating at least a portion of their surface with a releasing composition comprising (a) a chlorosulphonated polymer; (b) a reinforcing filler and (c) a green tackifying agent. Optionally, these compositions can also contain a chemical curing system and one or more volatile solvent/diluent viscosity-reducing vehicle. In a specific example, the coating are applied to flexible structures used in machines for the manufacture of articles having natural tack due to their rubber or elastomer content.

3 Claims, No Drawings

ELASTOMERIC STRUCTURES HAVING CONTROLLED SURFACE RELEASE CHARACTERISTICS

FIELD OF THE INVENTION

This invention relates to elastomeric structures having controlled surface release characteristics. More specifically, it relates to flexible structures and machinery components wherein the release characteristics are controlled with a surface coating which releases or inhibits adhesion of naturally sticky or tacky materials with which the coated surface may come in contact. In a particular embodiment, this invention relates to flexible diaphragms, bladders, bags, rolls, sleeves and the like with or without fabric reinforcement having controlled surface release coatings which are useful in tire assembly machines (TAMs). These coated flexible structures readily release partially assembled tires and thus facilitate their efficient manufacture. The invention also relates to exposed release surface coatings, methods and intermediates for making same, and tire building methods employing them.

BACKGROUND OF THE INVENTION

The problem of releasing manufactured articles and processed goods from flexible machinery components with which they may come is contact is a recurring one that arises in many varied situations. Unless it is adequately solved, undesirable adhesion of the materials or goods any hinder or even block assembly and conveyor lines. In extreme cases, the articles and goods as well as machinery can be damaged by such blockage. The problem is particularly prevalent with elastomeric structures or components such as conveyor belts and devices such as flexible diaphragms, bags, bladders, sleeves and the like which are often made of elastomeric materials such as rubber which possess natural stickiness or tack. The solution of such problems in convenient, safe and efficient manner allows high speed manufacturing and processing operations with minimal damage and delay. The solution of such problems may be complex because some degree of adhesion is usually desirable or necessary to allow efficient functioning. If machinery components are too slick, improper positioning of components and work pieces can occur. Therefore it is optimum to have a means of controlling surface adhesion characteristics as the present invention provides.

The present invention is directed to convenient, safe, economical and expeditious means for controlling the natural surface tack or stickiness of flexible elastomeric structures and machinery components such as belts and polymeric diaphragms such as found in bags, bladders, sleeves, and the like. It comprises forming on the flexible surface which contacts the articles or goods, an exposed controlled adhesive release coating which is fracture (that is, crack) resistant. Surprisingly this surface coating or film can be formed from materials which is some cases have previously found use as components of adhesives or bonding agents, an application that is antithetical to the purpose they serve in the present invention. In one embodiment of the invention, the surface release coating is applied or formed on at least a portion of the surface (usually the outer surface) of a flexible diaphragm which, through inflation or other mechanical means, exerts pressure on a naturally sticky article such as one made of rubber. In other embodiments, the invention is employed in conveyor belts and molds which contact such diverse materials such as thermoplastic articles and frozen food goods during their collection, processing and storage. For convenience and brevity, the use of the invention in the former application will be discussed in detail below. By so doing, it is to be understood that the full scope of the invention is in no way thereby limited.

Machines for the assembly of tires (TAMS) contain elastomeric structures such as inflatable rubber bladders which are conventionally used for such manufacturing operations as turning up ply ends over bead rings and against plies on the TAM mandrel or drum. These rolling, inflatable turn-up bladders (TUBS) turn the ends of the plies wrapped on the tire building mandrel up around the bead rings and over them against the ply material. The rubber ply material is tacky by nature, and it is this tack which causes the plies to stick together and thus maintain the integrity of the partially built or green tire. The TUBS are conventionally made from vulcanized rubber, natural, synthetic or mixtures of the two with optional fabric reinforcement, and the tacky ply ends have a tendency to stick to the outer surfaces of the bladder which turn them up, particularly, since the inflated bladders exert pressure on the turned-up ply ends. This adhesion tends to retard the retraction of the deflated bladders, and it can also result in erosion of the bladder material coming in contact with the ply ends. Thus it is desirable to provide TUBS with surfaces which are non-adhesive or releasing to the tire plies with which they may come in contact. One solution to this problem is found in U.S. Pat. No. 4,381,331 to Johnson, which describes a ply turnover bladder having at least a portion of its outer surface comprising a fabric layer of spaced cords calendered with a coating of unvulcanized, uncured rubbery polymer, the spaces between the cords being free of said polymer at the surface so that the cords project above said surface. It has been found that this structure has reduced tendency to adhere to the rubber ply of tire components and thus release the tire during its manufacture. Naturally, the construction of the Johnson bladder is somewhat complex, involving several manufacturing and, particularly, finishing steps which must be carefully controlled to achieve the desired controlled adhesive surface. For this reason, Johnson bladders are expensive to make.

Another related embodiment of this invention is found in tire curing bladders having an outer releasing surface coating and in a method of curing tires utilizing such coated bladders. Conventionally, pneumatic rubber vehicle tires are produced by molding and curing a green or uncured and unshaped tire in a molding press. In the press, the green tire is pressed outwardly against the mold surface by means of an inner, fluid-expandable bladder. By this means the green tire is shaped against the outer mold surface which defines the tires tread pattern and configuration of the sidewalls. Generally, the bladder is expanded by internal pressure provided by a fluid such as hot gas, hot water, and/or steam. The use of such tire curing bladders is well known in the art of tire manufacture. It is also known that difficulties may occur between the bladder and the inner surface of the tire if there is excessive adhesion, that is, the lack of release between the two. Typically, this results in deterioration of the bladder, misshaping of the tire in the mold, and similar problems. Furthermore, air bubbles can potentially become trapped between the bladder and tire surfaces and promote tire vulcanization defects. For this reason, it is conventional practice to precoat the inner surface of the green or uncured tire with a lubricant in order to provide lubricity between the outer bladder surface and the inner tire surface. Such lubricants have sometimes been called lining cements, band ply dopes and bag dopes. Conventionally, the inner surface of the green tire, which is typically a rubber gum stock, is simply spray coated in a combined ventilated spray booth with a lubricant which might, for example, be based on silicone polymers. Other additives may also be conventionally utilized in this application, such as mica, polymeric materials, polyols, polyethers, clays, and the like. Another approach to this problem is the alternative of coating the bladder itself. One such example of a tire curing bladder lubricant is found in U.S. Pat. No. 4,359,340, to Comper, et al, which describes an aqueous lubricating composition for tire curing bladders containing polydimethylsiloxane, a silane, a surfactant and, optionally, a metal salt of an organic acid.

Still another means of solving the problem of undersirable adhesion between tacky tire plies and similar elements and flexible TAM components such as bladders and sleeves is the so-called Red Release coat developed by The Firestone Tire & Rubber Company. This coat consists of a polymeric film formed from a fluxed (that is, heat-treated) blend of PVC and a copolymer of butadiene and acrylonitrile (for example, Paracril OZO). This material is available as a thin sheet that is cemented to the bladder or sleeve on which the release coating is desired. The red release coating can be subject to cracking during use. Such cracks have been found to propagate into the flexible underlying elastomeric structure and thus cause premature failure of the component. One of the cements used in adhering the red release coat to flexible diaphragms such as bladders, sleeves, bags and the like is Chemlok-234B, which is described in more detail below.

SUMMARY OF THE INVENTION

It is an object of the present invention to provide a fracture resistant, surface coating of controlled release characteristics for elastomeric structures such as flexible diaphragms, bladders, bag, and sleeves and the like. Such release coatings allow rapid, unimpeded release of green tires and other rubber articles during their formation, construction and processing. Another object of the invention is to provide a bladder having a fracture resistant releasing surface coating. Another object is to make bladders with more design freedom, and, for example, a TUB with flexible nose which in turn produces a tighter bead turn-up. It is still another object of the invention to provide a process for manufacturing such elastomeric structures (e.g., bladders) and a process for manufacturing tires and other tacky articles using such release coated structures. Other objects of the invention will appear in the course of the description thereof which follows.

The above-mentioned objects can be achieved by the practice of the invention which in one embodiment comprises a fracture resistant, exposed release surface coating of release-effective thickness for an elastomeric structure formed by the method which comprises the steps of:

(I) applying to at least a portion of the surface of the structure a releasing composition comprising:
   (a) a chloro-sulfonated polymer;
   (b) a reinforcing filler;
   (c) a green tack agent; and optionally
   (d) a suitable chemical curing system; and, optionally,
   (e) a first inert, volatile solvent/diluent viscosity reducing vehicle for (a)-(d); and, optionally,
   (f) a second inert, volatile solvent/diluent viscosity reducing vehicle;

(II) removing a sufficient amount of the first and second vehicle to form a coherent adhering film; and (III) curing the film to form the exposed release coating.

Other embodiments of the invention include flexible elastomeric structure having controlled release characteristics through the presence on at least a portion of their surface of a crack resistant release exposed surface coating formed as described above in accordance with the invention and methods for making such elastomeric structures such as bladders, bags, diaphragms, rolls, sleeves and the like with the aforedescribed releasing surface coating as well as for forming the coating. Machines, for example, TAMs comprising such elastomeric structures (e.g., bladders) and methods of making and using them are also within the scope of the invention as are methods for using them.

DETAILED DESCRIPTION OF THE INVENTION

Materials suitable for a practice of the present invention are in many cases generally known to those of skill in the art. In other cases, they can be prepared by those of skill in the art without undue experimentation or hardship. For example, chlorosulfonated polymers, particularly chlorosulfonated hydrocarbon polymers are known to the art. In many cases those chloro-sulfonated polymers exhibiting elastomeric properties are useful in the practice of the present invention. A particular class of chloro-sulfonated polymers are the chloro-sulfonated polyethylenes known to the rubber industry. Such materials are described in the literature; see, for example, the *Vanderbilt Rubber Handbook* published by the R. T. Vanderbilt Company of Norwalk, Conn., U.S.A. (1978) particularly pages 300–307. A series of commercially available chlorosulfonated polyethylene is sold by the E. I. duPont de Nemours and Company of Wilmington, Del., U.S.A., under the trade name Hypalon. Hypalons are thermoplastic elastomers which are available in at least six grades designated as Hypalon 20, 30, 40, 4085, 45 and 48. These materials have Mooney viscosities [ML 4' at 100°C. (212°F.)] of 28 plus or minus 6, 31 plus or minus 7, 56 plus or minus 5, 98 plus or minus 8, 37 plus or minus 6 and 78 plus or minus 8, respectively. Hypalons can be cured with a variety of systems including metallic oxides, sulphur bearing organic compounds and epoxy resins. Organic rubber accelerators, particularly those containing nitrogen, may also be used in the cure system; other curing systems such as peroxide curing systems and cyanurate systems can also be used. Hypalon solutions have been used in coatings because the resulting films have excellent colorability and weatherability. Practical solvents for Hypalons include toluene, trichloroethylene, 1,2-dichloroethane, and dichlorobenzene. The above-noted *Vanderbilt Rubber Handbook* is hereby incorporated by reference for its disclosures relating to Hypalon and similar materials and their uses.

Reinforcing filler materials useful in the practice of the present invention are also well known to those of skill in the art. See, for example, the above-referenced *Vanderbilt Rubber Handbook*, particularly pages 347-349. Typical fillers include carbon black and silica. Many grades of carbon black suitable for use in the present invention are available. Particularly useful are those having surface areas (EMSA) of at least 20m$^2$/g. and more preferably at least 35m$^2$/g. up to 200m$^2$/g or higher. Surface area values recited in this application are those determined by ASTM test method D-1765 using the cetyltrimethyl-ammonium bromide (CTAB) technique. A typical example of useful carbon blacks include superabrasion furnace (SAF) blacks, high abrasion furnace (HAF) blacks, fast extrusion furnace (FEF) blacks, fine furnace (FF) blacks, intermediate superabrasion furnace (ISAF) blacks, semi-reinforcing furnace (SRF) blacks, medium processing channel blacks, hard processing channel blacks and conducting channel blacks. Various grade of such blacks are referred to in the trade by their ASTM designations (D 1765-28a) N-110, N-220, N-339, N-330, N-550 and N-660. Other reinforcing materials such as fumed silica, silica dioxide and various type of clay known to those of skill in the art to exert reinforcing action on elastomer compositinos containing them can also be used. Modified carbon blacks, particularly those modified with organonitrogen compounds can also be used as can other black reinforcing fillers such as bituminous fine black, ground and pulverized anthracites and other mineral blacks. Austin Black 325, Carb-O-Fil and Kenmix SRF Carbon Black/G are specific typical examples of these materials.

The releasing compositions used in the practice of the present invention also contain a green tack agent (in this context, green refers to uncured, unvulcanized rubber or elastomer, not to color). Typically, this material is a resin which functions to maintain a certain degree of adhesion of the surface coating to the underlying surface of the elastomeric structure being coated, particularly during the initial stages of coat formation. The green tack agent may also aid during curing to strengthen the three dimensional network coating. Many suitable green tack agents are known to those of skill in the art. See, for example, the compendium entitled *Materials and Compounding Ingredients for Rubber*, published by *Rubber World* magazine, a subsidiary of Bill Communications Inc., New York, NY, U.S.A. (1975), particularly pages 198-205, which are hereby incorporated by reference for their disclosure relating to green tack agents (tackifiers) useful in the present invention. Among the specific types of useful tackifiers are alkylphenol/formaldyhyde resins, 70 percent chlorinated paraffin resins (Chlorez 700), poly(beta) terpene resins (e.g., Crotorez), dehydroabietic resins, ethylene vinyl acetate, chlorinated polyethylene resins, modified petroleum resins (Picco series from Hercules, Inc.), the polyterpene resins (e.g., Piccolyte series of resins), the chlorinated paraffin oil resins (Paroil 2400A - Chlorovis 150A from Dover Chemical Co.), the pine wood tar resins, the aromatic petroleum hydrocarbon resins and various metal resinate compositions. Particularly useful are the hydrocarbon green tackifying agents, the chlorinated paraffin resins such as Chlorez 700, the terpene and poly(terpene) resins (and their chlorinated and brominated analogs) and halogenated polyolefin resins such as chlorinated polyethylene resins of molecular weights (Mn) about 1000 to 30,000.

In many instances the releasing compositions of this invention contain a chemical curing system containing sulphur and/or nitrogen which is suitable for promoting curing (vulcanization) of the composition and particularly the polymer(a). In some instances, particularly where the polymer(a) is thermoplastic and/or capable of self cure, particularly after a period of storage or use, or the composition is subjected to curing high energy radiation, inclusion of a chemical curing system is not required. Therefore, in its broad aspect, the releasing compositions (and the method of forming and exposed releasing coating) of this invention, the use of a chemical curing agent is optional. Also optional is the use, where appropriate, of sensitizers and similar adjuvants for curing in those systems which are self curing or radiation curing. Typically, however, the releasing compositions of this invention contain a sulfur and/or nitrogen-containing curing system.

Many suitable curing systems for the components of the releasing compositions of the present invention are known. Among these the sulphur-based systems are common, particularly those also containing conventional amounts of nitrogen-containing accelerator and activator compounds. Other chemical cure systems can also be used. When the chloro-sulfonated polymer is a Hypalon (or mixture containing Hypalon) various known systems such as metallic oxides (litharge, magnesia), sulphur bearing organic compounds and epoxy resins can be used. Peroxides, particular in combination with nitrogen compounds such as triallyl-cyanurate can be used. Commercial sulphur systems such as Sulfads and Methyl Tuads plus sulphur can also be employed. It is also possible, in certain instances, to cure the release compositions with high energy electromagnetic radiation.

The releasing compositions of the present invention also contain optionally one or more inert, volatile, viscosity-reducing solvent diluent vehicles. These vehicles aid primarily in providing the releasing composition with a convenient means of application through reducing its viscosity and functioning to solublize or to stabily disperse the composition so that it may be conveniently applied in thin films. A solvent diluent in the context of this application is an organic liquid having a boiling or evaporation range of approximately 20°-200°C. at atmospheric pressure and which is capable of either dissolving or stably dispersing the various components of the system as described above to form a homogeneous, relatively nonviscous liquid that may be applied by painting, dipping, spraying, or other suitable techniques.

The release coatings of the present invention are surface coatings; that is, they coat at least a portion of the surface of the elastomeric structures on which they are used. The surface is often an outer or top surface, for example of a bag, bladder, or belt, but in the case of a sleeve or constricting device, it may be an inner surface. In any event it is an exposed surface; there is no additional layer or film covering it and the coating makes more or less direct contact with the object, article, or good it is intended to release or prevent adherence of.

Among the solvent/diluents that can be used in the practice of the present invention are hydrocarbon solvents such as liquid alkanes and cycloalkanes of about 6-12 carbons and liquid aromatic solvents of 6-12 carbon atoms, particularly benzene, toluene and the various xylenes. Mixtures, typically commercial solvents, such as varsol, gasoline, VM&P naphtha, kerosene, and similar materials also are useful Halogenated, and particularly chlorinated, liquid alkanes and aromatics can also be conveniently used. Among specific examples are chlorocyclohexane, 1-1 dichloroethylene, perchloroethylene, perchloroethane, chloroform, chlorobenzene, benzene, toluene, chlorotoluene, M-xylene and mixtures of two or more of these. These soluent diluents are generally inert to the other components of the releasing composition, that is, they do not detrimentally interfere with the functioning of the components for their intended purpose. They are used in amounts suitable to reduce the viscosity of the composition to desirable levels, generally to levels approximating the viscosity of the solvent/diluent itself. Typically, such amounts will be approximately 10-15 volume percent of the releasing composition up to as much as approximately 60-90 volume percent of the composition. In certain cases the amount of solvent/diluant can be as high as 90-95 volume percent of the releasing composition.

In certain embodiments of the invention, it is convenient to use the solvents in two stages. Because of this, it is convenient to refer to a first and second solvent/diluents. These constitute different stages of dilutions rather than distinct materials. Thus, optionally, the releasing compositions of the invention may contain a first solvent/diluent and a second solvent/diluent. This is usually done for convenience of handling and transport of a concentrate. Thus, a base releasing composition can be made up with a certain amount of solvent/diluent in a relatively concentrated form which is economical to handle, ship and store. Then, before use, this concentrate is further diluted with a second solvent/diluent to provide the final formulation having the desired viscosity properties which facilitate application. Generally, the first and second solvent diluents are both chosen from the aforedescribed classes of solvents. For example, a first solvent/diluent may be a mixture of perchloroethane and chlorotoluene (50/50) constituting a total of about 75 percent by volume of the concentrated release composition and the second solvent/diluent may be toluene or xylene. This second batch of solvent/diluent may be used in amounts ranging from about 0.5-3 parts per 1 part of concentrated releasing composition containing the first solvent/diluent constituting 50-70 percent by volume of the concentrated composition. Generally, the practice of the invention is not dependent on a particular choice of first and/or second optional solvent/diluents nor on the use of specific proportions thereof.

TABLE I

| Releasing Composition | |
|---|---|
| COMPONENT | PARTS BY WEIGHT |
| (a) Chlorosulfonated Polymer | 10-100 |
| (b) Reinforcing Filler | 20-200 |
| (c) Green Tackifying Agent | 10-90 |
| (d) Curing System (if present) | 0.1-10 |
| (e) First Solvent/Diluent | As Needed* |
| (f) Second Solvent/Diluent | As Needed* |

*To provide desired viscosity

The various components of the release surface coatings of this invention are used in generally effective amounts. Table I shows the preferred range of parts by weight of each of essential component (a)-(c). Other desirable but non-essential components are used in suitable amounts as are the solvent/diluents.

The aforedescribed components of the releasing compositions of the present invention can be combined by suitable techniques well known to those of skill in the art such as mixing, blending, compounding and the like. When the materials are available as solids, it may be necessary to first grind or dry mix them or, typically, dissolve them in a compatible inert solvent as described above to facilitate their dispersion. The use of mechanical mixers and agitators may be convenient and such devices are well known. In a typical embodiment, the various components of the release composition are blended with a convenient amount of inert solvent/diluent to form a homogeneous blend which is stored until used. Then the additional amounts of solvent/diluent are added to produce the final composition of desired viscosity.

The release composition can contain various adjuvants and supplemental ingredients such as pigments, fillers, accelerators, retardants, anti-degrandants, and the like which enhance and improve the effectiveness of these inventive release compositions. While desirable, such added materials are not essential to satisfactory practice of the invention.

Application of the release coating compositions, and formation of the release coating can be accomplished by suitable techniques known to those of skill in the art such as painting, spreading, dipping, spraying and the like. Generally, satisfactory practice of the invention is not dependent on a particular means of applying the releasing composition to the elastomeric structure to be coated. The release surface coating is formed in a release effective thickness on the elastomeric structure. Such thickness is one which is effective in providing the desired release characteristics to the coating, along with acceptable properties of durability, integrity and the like. Generally, the thickness of the coating is limited only by the necessity for the elastomeric structure to maintain its flexibility. In general, it has been found that typical coatings range in thickness from 0.0005 to approximately 0.01 inches, though thicker coatings may be desirable in certain instances.

In some cases it is desirable to coat the entire surface of the elastomeric structure with the release coating. In other cases, it may be more convenient, desirable and economical to coat only the portion of the structure which comes in contact with the article or goods to be released. In such cases, as little as 10 percent of the surface area may be coated up to approximately 90-95 percent or even more of the surface. Generally, the outer surface of such structures as bags, bladders and the like are coated; in certain instances, however, it may be desirable to coat the inner or both the inner and outer surfaces in whole or part. Usually the upper surface of belts and similar components are closed.

Prior to curing the solvent is allowed to evaporate either under ambient conditions or at convenient elevated temperatures. In either case, care is taken to ensure adequate ventilation. Such evaporation processes are typically carried out in many situations and are well known to those of skill in the art and present no problems in the practice of the present invention.

After application by suitable techniques and solvent evaporation, if applicable, the releasing surface coatings of the present invention are optionally cured by any convenient technique. In certain instances storage for a relatively long period of time (e.g., 10 days) at ambient temperatures (15-35°C.) may be satisfactory. It is often desirable, however, to accelerate curing by using shorter times and compensating higher temperatures. For example, temperatures ranging from about 35°-225°C. (65-435°F.) may be used for periods of 10-200 minutes or more. Often it is desirable to subject the coating to some form of restraint during curing to prevent unintended movement and/or the development of blisters or similar defects. Many techniques suitable for this purpose are known in the art. For example, in the case of bladders, bags, rolls and sleeves, it is possible to cross-wrap the release coated elastomeric structure with an inert material such as tape or sheeting, and thus subjecting the structure and surface to pressure during the curing process. It is sometimes desirable to coat such sheeting or taping with a conventional releasing agent to prevent undesirable adhesion during this stage.

It is possible to use releasing composition components which do not require chemical curing agents. Radiation-curable systems can be used. Also thermoplastic chlorosulphonated polymers may function satisfactorily without conventional curing. It is believed in this latter instance, curing occurs spontaneously at a relatively slow rate during storage even though chemical curing agents are absent.

Generally, the fracture resistant release surface coating of the invention is cured for times sufficient to provide a release coating. Often visual inspection of the coating will indicate when this condition is reached. The coating changes from its typically shiny, wet appearance immediately after application to a dull, mat appearance when sufficiently cured. Of course, tactile investigations can also reveal when a satisfactory state of cure is reached.

EXAMPLES AND DESCRIPTION OF BEST MODE

The following examples illustrate the practice of the invention but are not intended in any way to limit its scope, as will be appreciated by those of skill in the art. They also include a description of the best mode of practicing the inveniton presently known. In them all parts and percentages are by weight and temperatures in degrees centigrade unless expressly indicated otherwise.

EXAMPLE I

A release coating composition is prepared by mixing 100 parts of chlorosulphonated polyethylene with 40 parts of N-660 carbon black and 100 parts of a chlorinated paraffin semi-solid tackifier. An effective amount (approximately 2 parts) of a conventional sulphur and nitrogen-containing curing system is included. This system includes Tetrone A, magnesia, and pentaerythritol (Tetrone A=dipentamethylene thiuram tetrasulfide). Added to those components as solvent/diluent is 300 parts of a mixture (50/50 by volume) of perchloroethane and monochlorotoluene. The above materials are blended until a homogeneous solution/dispersion is obtained. This dispersion appears to be a black liquid having the approximate viscosity of a premium motor oil.

Immediately prior to use 100 parts by volume of the solution/dispersion is diluted with 150 parts by volume of toluene to yield, after agitation, a releasing composition of suitable viscosity. This releasing composition is painted on a TUB made from fabric reinforced natural rubber to substantially cover the outer surface thereof. After air drying, the uncured TUB is cross-wrapped with nylon tape and cured in the usual manner at approximately 120°-150° for 45 minutes. The bladder is then installed in a TAM.

EXAMPLE II

Example I is repeated with 100 parts of chlorosulfonated polyethylene replacement of the green tackifying agent with 70 parts of highly chlorinated polyethylene resin. The releasing properties of the composition are verified by painting it on a natural rubber ply and, after drying and heating at 125°C. for 90 minutes, observing the controlled adhesive quality of the surface towards a second natural rubber ply.

EXAMPLE III

A mixture of three parts by volume of Chemlok 234B is diluted and agitated with two parts by volume toluene to form a homogeneous black solution/dispersion of appropriate viscosity. The Chemlock 234B is a black adhesive composition containing 25 percent organic compounds, polymers and fillers dissolved or dispersed in 75 percent organic solvent which is 50 weight percent xylene and 25 weight percent trichloroethylene. This preparation is commercially available from Hughson Chemicals, Lord Corporation, Erie, Pennsylvania, USA. Typical properties of 234B are shown in Table II.

TABLE II

| TYPICAL PROPERTIES OF CHEMLOK 234B | |
|---|---|
| Composition | A black adhesive composition containing organic compounds, polymers and fillers dissolved or dispersed in organic solvents. |
| Solids Content | 22.5–26.5% |
| Diluents | Xylene or toluene |
| Weight | 8.9–9.2 lbs./gal. (1066–1102 kg/m$^3$) |
| Specific Gravity | 1.09 |
| Flash Point (Pensky-Martens Closed Cup) | 83° F. (28° C.) |
| Viscosity: Brookfield Model LVT, No. 2 spindle at 30 rpm at 25° C. (77° F.) | 450–800 cps (.450–.800 Pa.s) |
| Shelf Life | At least one year. |

Chemlock 234B is further analyzed by independent means. The residue upon solvent evaporation (about 25 percent) exhibits an infrared spectrum with major absorption peaks as shown in Table III.

TABLE III

| Major Absorbtions in Infrared Spectrum of Chemlok 234-B Residue (evaporated a KBr Plate), CM$^{-1}$ | | |
|---|---|---|
| 2940 | 1260 | 780 |
| 2860 | 1100 | 575 |
| 1485 | 1100 | 485 |
| 1420 | 865 | |

Further analysis of Chemlok 234B is accomplished by diluting a sample with toluene and centrifuging. The nondissolved material (5.6%), apparently carbon black and other materials, has an elemental composition of percent carbon, 62.93; percent hydrogen, 2.32; percent nitrogen, 17.07. The supernatant, toluene soluble portion appears to be a pale yellow solution. Addition of a large of volume of methanol produces at coagulated polymer. This methanol insoluble polymer has an elemental composition of: percent carbon, 47.06%, percent hydrogen, 8.40; percent nitrogen, 0.06; percent chlorine, 40.2; percent sulphur, 0.95–1.09. Infrared and NMR analysis indicates this methanol insoluble polymer is chlorosulphonated polyethylene. The spectrum corresponds to the spectrum of chlorosulphonated polyethylene found in standard published spectra atlases. Thermogravimetric analysis and the $T_g$ of the polymer (−23°C.) are consistant with this identification.

The supernatant from the methanol coagulation is evaporated to provide a methanol and toluene soluble resinous material. Infrared and NMR analysis indicates this material is a chlorinated polyethylene of low molecular weight and/or a chlorinated terpene type resin. The resin is semi-solid, tacky and pleasantly odiferous. Comparison of its IR and NMR spectra with those published are consistent with this identification. Further analysis of Chemlok 234B as commercially available shows it to contain 24.65 percent solids after evaporation of the solvents. This solid fraction exhibits the following elemental analysis; percent carbon, 45.49; percent hydrogen, 4.28; percent nitrogen, 3.36; percent sulphur, 0.5; percent chlorine, 42.3; percent ash (normal), 0.59; percent methanol soluable, 43.80; percent toluene soluable, 37.45 Thermogravimetric analysis indicates percent carbon black, 22.6; and percent ash, 0.70. The ash is also shown to contain magnesium.

The aforedescribed mixture of Chemlock 234B and toluene is used as a releasing composition of the present invention. It is painted on the outer surface of the TUB and the TUB then cured with cross-wrapping in a conventional manner. The TUB is then used in a factory TAM to produce an average of 6,000 tires. During this production run, the bladders with the releasing coating of this invention are observed to give good, tight turnups and to perform without cracking or other problems.

EXAMPLE IV

This example is carried out in essentially the same manner as Example III except Chemlok 234B-E is used in place of Chemlok 234B. Chemlok 234B-E is also available from the same source as 234B and is understood to contain the same active ingredients as 234B. The solvent system, however, is modified to be exempt from certain health and environmental regulations and constitutes monochlorotoluene and perchloroethylene rather than xylene or toluene and trichloroethylene. Typical properties at Chemlok 234B-E are shown in Table IV. The release coating formed exhibits satisfactory performance when it is evaluated in a laboratory screening test.

TABLE IV

| Typical Properties of Chemlok 234B-E | |
| --- | --- |
| Viscosity, Brookfield Model LVT No. 2 spindle at 30 RPM, 77° F. (25° C.) | 550–650 cps .550–.650 s/M$^2$ |
| Solids Content | 20–22% |
| Color | Black (liquid) |
| Weight | 10.4–11.0 lbs./gal. 1258–1306 Kg/M$^3$ |
| Diluents | Perchloroethylene and Monochlorotoluene |
| Flash Point (Pensky-Martens Closed Cup) | 103° F. (39° C.) |

EXAMPLE V

A turn-over bladder is constructed in substantially the manner described by Johnson in U.S. Pat. No. 4,381,331 (which is hereby incorporated by reference herein) to an intermediate stage of manufacture before final curing. After calendaring the textile fabric covering with a coat of uncured and unvulcanized rubber (see column 1, lines 45–62 of Johnson), the uncured rubber coated surface is painted with the release coating composition of Example III. The bladder is vulcanized in the manner described by Johnson; it is not, however, abraded or otherwise treated to remove rubber in any manner. The cords of the bladder do not project above the surface of the rubber substrate, and in fact lie beneath the cured release coating.

The bladder is used successfully in a TAM to make more than 3,000 tires.

The elastomeric structures of this invention can be made of natural rubber, synthetic rubber or mixtures thereof with each other and/or other materials which do not substantially impair their elastomere nature.

What is claimed is:

1. A bladder, for use in a tire assembly machine having about 10–90% of its outer surface bearing an exposed releasing surface coating of release-effective thickness formed by the method comprising the steps of:
   (I) Applying to the outer surface of the bladder a releasing composition comprising:
      (a) a chlorosulphonated polyethylene having a Mooney viscosity of about 30–160;
      (b) a carbon black or silica reinforcing filler;
      (c) a green tackifying agent; and optionally
      (d) a suitable chemical curing system; and optionally
      (e) a first inert, volatile solvent/diluent viscosity-reducing vehicle for components (a)-(d), and optionally
      (f) a second, inert volatile solvent/diluent viscosity-reducing vehicle;
   (II) Removing a sufficient amount of vehicles present to leave a coherent, adhering film on the surface; and
   (III) Curing the film to form the exposed releasing coating consisting essentially of said chlorosulphonted polyethylene (a), said carbon black or silica filler (b), said green tackifying agent (c) and optionally said chemical curing system (d).

2. A turnup bladder as claimed in claim 1.

3. A fabric reinforced turnup bladder, TUB, for use in a tire assembly machine, having at least about 10–95% of its surface covered with a fracture-resistant, exposed releasing surface of release effective thickness for an elastomeric structure formed by the method which comprises the steps of:
   (I) Applying Chemlok 234B or 234B-E in an inert solvent/diluent vehicle to at least a portion of the surface of the bladder;
   (II) Removing by evaporation at about 20°–75° Centigrade a sufficient amount of the vehicle present to leave a coherent, adhering film on the surface; and
   (III) Curing the film to form the exposed releasing coating consisting essentially of said Chemlok 234B or 234B-E; wherein said Chemlok 234B is a black adhesive composition containing approximately 25 weight percent of a carbon-, hydrogen-, nitrogen-, sulfur-, and chlorine-containing reside dissolved or dispersed in 50 weight percent xylene and 25 weight percent trichlorethylene, said residue exhibiting: (a) major absorptions in its Infrared spectrum (evaporated on a KBr plate) at 2940, 2860, 1485, 1420, 1260, 1100, 1010, 865, 780, 575 and 485 cm$^{-1}$; (b) the following elemental analysis in weight percent: carbon, 45.49; hydrogen, 4.28; nitrogen 3.36; sulfur 0.5; and percent chlorine, 42.3; and (c) the following properties in weight percent: ash (normal) 0.59; methanol soluble, 43.80; toluene soluble, 37.45; said ash also containing magnesium and; wherein Chemlock 234B-E is the same as Chemlok 234B except it contains approximately 20–22 weight percent of said residue and monochlorotoluene trichloroethylene.

* * * * *

UNITED STATES PATENT AND TRADEMARK OFFICE
CERTIFICATE OF CORRECTION

PATENT NO. : 4,853,069

DATED : August 1, 1989

INVENTOR(S) : Cleo M. Williams et al.

It is certified that error appears in the above-identified patent and that said Letters Patent is hereby corrected as shown below:

Column 1, line 31

"any" should be -- may --

Column 12, line 67

After "chlorotoluene" insert -- and perchloroethylene in place of xylene and --

Signed and Sealed this

Fifth Day of June, 1990

*Attest:*

HARRY F. MANBECK, JR.

*Attesting Officer*      *Commissioner of Patents and Trademarks*